Patented Sept. 8, 1936

2,053,474

UNITED STATES PATENT OFFICE

2,053,474

HIGHER ALKYL BORATES AND SILICATES AND PROCESS FOR PREPARING SAME

George Dewitt Graves, Wilmington, and James Herbert Werntz, Marshallton, Del., assignors to E. I. du Pont de Nemours & Company, Wilmington, Del., a corporation of Delaware No Drawing. Application December 11, 1934, Serial No. 756,976

27 Claims. (Cl. 260—98)

This invention relates to new esters of boric and silicic acid and more particularly refers to long chain alkyl esters of such acids and processes for their production.

It is an object of this invention to produce esters of high molecular weight containing boron or silicon. A further object is to produce esters of boric and silicic acid containing a plurality of dissimilar hydrocarbon groups. A still further object is to obtain new compounds which are of particular value as plasticizers, high pressure lubricants, dispersing agents, etc. Additional objects will become apparent from a consideration of the following specification and claims.

These objects are attained according to the herein described invention which comprises esterifying boric or silicic acid with alkyl alcohols containing from 8 to 14 carbon atoms. In a more restricted sense this invention is directed to the esterification of boric or silicic acid with a mixture of alcohols at least one of which is a normal primary alcohol containing from 8 to 14 carbon atoms. In its preferred embodiment the invention pertains to the esterification of boric or silicic acid with normal primary alcohols containing from 8 to 14 carbon atoms and predominating in dodecyl alcohol.

The invention may be more completely understood by a consideration of the following illustrative examples.

Example 1

*Triodecyl borate.*—14 parts by weight of boron oxide and 223 parts by weight of dodecyl alcohol were heated 3 hours at 180° C. with carbon dioxide bubbling through in order to remove the water. The product was then vacuum distilled at 185° C. and 23 mm. and 37 g. of product was removed. The ester analyzed 1.2% boron (calculated 1.9%).

Example 2

*Tetradodecyl ortho-silicate.*—238 parts by weight of dodecyl alcohol and 57 parts by weight of silicon tetrachloride were slowly mixed together at room temperature. Hydrogen chloride was evolved freely. After standing 15 minutes the reaction mixture was warmed on a steam bath under vacuum for an hour. The reaction product was then heated to 300° C. at 24 mm. to remove any volatile material and 194 parts by weight of ester was isolated. On standing, a precipitate settled from the liquid which was filtered off. The liquid was analyzed for silicon and found to contain 3.9%, calculated 3.5%.

Example 3

*Tetradodecyl ortho-silicate.*—Ethyl silicate was prepared by reacting absolute ethyl alcohol with silicon tetrachloride and collecting the fraction which distilled at 165–168° C. 74.4 parts by weight of dodecyl alcohol and 25 parts by weight of tetraethyl silicate were heated over night on a steam bath in a flask with a calcium chloride tube attached to prevent moisture from entering. The flask was then heated to remove volatile materials which distilled up to 170° C. The liquid was finally heated on a steam bath under water pump vacuum and 80 g. of a light yellow liquid remained which analyzed 4.2% silicon, calculated 3.64%.

Example 4

*"Coconut alcohol" ortho-silicate.*—Tetraethyl silicate was prepared by reacting absilute ethyl alcohol with silicon tetrachloride and collecting the fraction which distilled at 165–168° C. 80 parts by weight of coconut alcohol and 25 parts by weight of tetraethyl silicate were heated over night on a steam bath in a flask attached to a calcium chloride drying tube to prevent the entrance of water. The flask was then heated to remove volatile materials which distilled up to 170° C. The liquid product was then heated on a steam bath and a light yellow liquid residue remained which was a mixture of the coconut alcohol ortho-silicates predominating in the dodecyl ester. The coconut alcohol was obtained by the carboxylic hydrogenation of coconut oil and contained hexyl alcohol 4 parts, octyl alcohol 81 parts, decyl alcohol 60 parts, dodecyl alcohol 390 parts, tetradecyl alcohol 160 parts, cetyl alcohol 115 parts, octadecyl alcohol 55 parts, eicosyl alcohol 15 parts. In place of this mixture of alcohols we may use a mixture of alcohols representing an intermediate fraction which, when converted to the ortho-silicate, is found particularly useful for plasticizing cellulose nitrate compositions and is composed of decyl alcohol 3 parts, dodecyl alcohol 39 parts, tetradecyl alcohol 16 parts, cetyl alcohol 10 parts, octadecyl alcohol 3 parts.

Tridodecyl borate and tetradodecyl ortho-silicate are liquids of low viscosity, soluble in ketones, esters, and hydrocarbons, but insoluble in water. They have extremely low vapor pressure at ordinary temperatures. They may be used with cellulose derivatives such as cellulose nitrate, ethyl cellulose, cellulose acetate for the formulation of lacquers and enamels. These esters afford a convenient means of introducing into nitrocellulose lacquers the elements of boron and silicon. The following examples are given to illustrate two types of compositions in which these esters may be used.

|  | Parts |
|---|---|
| Ethyl cellulose | 12 |
| Resin | 6 |
| Tridodecyl borate | 6 |
| Paraffin wax | 2 |
| Solvent | 170 |

This composition, when dried at elevated temperature, imparts a high degree of moistureproofness to articles coated therewith. The same lacquer without the wax will air-dry in a few minutes to give a tough, flexible film.

|  | Parts |
|---|---|
| Cellulose nitrate | 100 |
| Tetradodecyl silicate | 25 |

This composition is adapted to the manufacture of plastic compositions. It may be prepared with or without the usual volatile solvents by the regular plastics process. It is to be understood that other cellulose derivatives, other resins and oils or pigments may be added to or used in place of those given in the above composition. It is also to be understood that any part of the plasticizer of the above composition may be replaced by other plasticizers such as dibutyl phthalate, tricresyl phosphate, dodecyl acid phthalate, or didecyl phthalate.

Tridodecyl borate or tetradodecyl silicate are substantially non-volatile and have been found to be satisfactory plasticizers not only for cellulose derivatives, but for natural and synthetic resins. Since they are readily soluble in ordinary organic solvents, they are readily miscible with other materials commonly used as plasticizers.

The advantage of these compounds for coating compositions lies in their relative inertness to water. Tetraethyl silicate hydrolyzes so readily that it can be used in coatings only for the deposition of silica. Tetradodecyl silicate on the other hand can be kept in contact with water for long periods without change.

The aforementioned examples are understood to be descriptive merely of a few modifications of the present invention. The individual components thereof and the conditions of reaction may be varied widely without departing from the scope of the invention. For example, the esterifying radical may be obtained from a broad range of alcohols or alcohol derivatives. It is advisable that at least one of these alcohols should contain from 8 to 14 carbon atoms. The alcohols or mixtures thereof which are selected for this purpose may be chosen from one or more of the well known series of alcohols such as the aliphatic series, the naphthenic series, the aralkyl series and hydrocyclic series.

Most satisfactory results are, in general, obtained by selecting alcohols which are primarily from the aliphatic series, although the invention is not restricted thereto. A few of the compounds which fall within this category are, for instance, octyl, decyl, dodecyl, and tetradecyl alcohols. In combination with one or more of these alcohols there may be used other alcohols, such as cetyl, octadecyl, oleyl, ricinoleyl, linoleyl, and hexyl alcohols. For optimum results it has been found that the selection of normal primary alcohols which contain from 8 to 14 carbon atoms is desirable. Where the alcohols are entirely, or in large part, compounds containing less than 8 or more than 14 carbon atoms the results are ordinarily considerably inferior thereto.

The alcohols previously mentioned which are preferred for use herein may be obtained from various sources. For example, by the sodium or catalytic reduction of coconut or palm kernel oils or acids, or other compounds of vegetable or animal origin. A mixture of alcohols is usually superior to any individual alcohol. The most satisfactory results appear to be obtained by utilizing a mixture containing mainly octyl, decyl, dodecyl and tetradecyl alcohols, said mixture predominating in the dodecyl fraction.

While normal primary alcohols are preferred it is contemplated, as heretofore mentioned, that other alcohols than those falling within such preferred class may be utilized, preferably in admixture with the aforementioned normal primary alcohols. A mixture comprising normal primary alcohols and alcohols of the aralkyl and/or hydrocyclic series has been found to be satisfactory for some purposes. Here again, the presence of appreciable portions of dodecyl alcohol and its near homologues results in an enhancement of the value of the resulting products.

In esterifying mixtures of alcohols with boric and/or silicic acid it is quite probable that the resulting esters vary considerably in their chemical structure, some of them containing esterifying radicals which are entirely dissimilar whereas others may contain two or more esterifying radicals which are the same. Likewise, it is contemplated that the boric and/or silicic acid may not be completely esterified. In the event the resulting esters are not completely esterified they may be used as such or may be neutralized with salt-forming compounds such as oxides and hydroxides of metals or organic compounds such as amines.

Esterification may be accomplished in accordance with different esterification reactions. Examples of a few of such reactions are:

(1) Reaction of the alcohol or alcohol mixture with silicon tetrachloride under anhydrous conditions, for example, decyl alcohol and silicon tetrachloride.

(2) Reaction of a high molecular weight alcohol or mixture of such alcohols with a volatile ester of silicic or boric acid, for example, tetradecyl alcohol, with ethyl silicate.

(3) Reaction of an alcohol or alcohol mixture thereof with boric acid, boric anhydride or boron trichloride, for example, octyl alcohol with boron trichloride.

The esterification reaction referred to above under (2) is entirely new and is particularly suited for this purpose. Long chain borates or silicates may be produced quite efficiently in accordance with this method. The alcohol or mixture thereof is selected in accordance with the aforementioned instructions. The volatile ester of silicic or boric acid may advisably be obtained by reacting a volatile alcohol such as ethyl alcohol with silicon tetrachloride or boron trichloride.

Many of the compounds produced and described herein may be represented by the following general formula:

$$(R'O)_aX(OR'')_b$$

wherein X represents boron or silicon; R' represents octyl, decyl, undecyl, undecylenyl, dodecyl, tridecyl, tetradecyl, pentadecyl; R'' repsents hydrogen, methyl, isobutyl, octyl, decyl, dodecyl, tridecyl, tetradecyl, cetyl, oleyl, myricyl or the hydrocarbon radicals of a mixture of alcohols, or radicals such as phenyl, benzyl, naphthenyl, abietyl, linoleyl, ricinoleyl, eleostearyl, sodium, potassium, ammonium, aniline, diethyl amino-, triethanol amino-, ½ Cu, ⅓ Fe, ⅓ Al, ½ Ca, cyclohexylamine, dialkyl cyclohexylamine, pyridine, piperidine, etc.; $a$ represents 1, 2, 3 or 4; $b$ represents 0, 1, 2 or 3; and the sum of $a+b$ is 3 where X is boron and 4 where X is silicon.

Additional esters contemplated herein are those derived from meta silicic acid such as dodecyl meta silicate, disilicic acid such as dodecyl disilicate, trisilicic acid such as dodecyl trisilicate, meta boric acid such as dodecyl meta borate, tetraboric acid such as dodecyl tetraborate.

The compounds comprised herein are suitable for use in numerous processes. For example, neutral borates and silicates are quite valuable for plasticizing natural and synthetic resins and in particular cellulose derivatives such as cellulose nitrate, ethyl cellulose and cellulose acetate. Borates and silicates derived from a mixture of alcohols containing from 8 to 14 carbon atoms and predominating in dodecyl alcohol are especially suited for this purpose since they are sufficiently non-volatile to remain in the plastic or coating composition for extended periods of time. The plasticizing value of these compounds is further enhanced by their tendency to reduce the inflammability of the material to be plasticized. For instance, tetradodecyl silicate or trialkyl dodecyl silicates in general appreciably reduce the tendency of nitrocellulose to ignite. In this connection it might be stated that where alkyl radicals of very high molecular weight are selected, such as in the case of tetracetyl silicate, the fire retarding properties of the compound, are considerably decreased, probably due to the decrease in silicon content. Tetraalkyl silicates derived from mixtures of alcohols previously referred to as preferable are ordinarily superior to pure tetradodecyl silicate since they do not exude from nitrocellulose and other plastics as readily as the pure silicates. Dodecyl borates and borates corresponding to the aforementioned silicates are quite useful for the same purposes either alone, in admixture with the silicates and/or in admixture with prior art plasticizers.

Acid esters of the described borates and silicates are of considerable value when added to high pressure lubricating oils. They are also of value in treating metals. Metal salts, and in particular alkali metal salts, of these borates and silicates are quite satisfactory for use as dispersing agents generally. A few additional uses of the various classes of compounds described herein are as ingredients of polishes, soaps, coating compositions for stone, etc.

As many apparently widely different embodiments of this invention may be made without departing from the spirit and scope thereof, it is to be understood that the invention is not limited to the specific embodiments thereof except as defined in the appended claims.

We claim:

1. Esters having the following general formula:

$$(RO)_a—X$$

wherein X represents boron or silicon and R represents the hydrocarbon residue of the compound and contains at least one aliphatic radical having from 8 to 14 carbon atoms, and $a$ represents the valence of X.

2. Esters having the following general formula:

$$(R'O)_a X(OR'')_b$$

wherein X represents boron or silicon, R' represents an aliphatic hydrocarbon radical having from 8 to 14 carbon atoms, R'' represents hydrogen or a hydrocarbon radical, $a$ represents 1, 2, 3 or 4, $b$ represents 0, 1, 2 or 3, and $a+b$ represents the valence of X.

3. Esters having the following general formula:

$$(RO)_a—X$$

wherein X represents boron or silicon and R represents the residue of the compound consisting of a plurality of dissimilar hydrocarbon radicals at least one of which radicals is aliphatic and contains from 8 to 14 carbon atoms, and $a$ represents the valence of X.

4. A mixture of esters having the following general formula:

$$(RO)_a—X$$

wherein X represents boron or silicon and R represents the residue of the compound consisting of a plurality of radicals of aliphatic alcohols, obtainable by the carboxyl reduction of coconut oil, at least one of said alcohols containing from 8 to 14 carbon atoms, and $a$ represents the valence of X.

5. Esters having the following general formula:

$$(RO)_a—X$$

wherein X represents boron or silicon and R represents the residue of the compound consisting of a plurality of aliphatic radicals one of which radicals is derived from dodecyl alcohol, and $a$ represents the valence of X.

6. Esters having the following general formula:

$$(RO)_4—Si$$

wherein R represents the residue of the compound consisting of a plurality of hydrocarbon radicals at least one of which radicals is aliphatic and contains from 8 to 14 carbon atoms.

7. Esters having the following general formula:

$$(RO)_4—Si$$

wherein R represents the residue of the compound consisting of a plurality of aliphatic radicals substantially all of which radicals contain from 8 to 14 carbon atoms.

8. Esters having the following general formula:

$$(RO)_4—Si$$

wherein R represents the residue of the compound consisting of a plurality of aliphatic radicals one of which radicals is derived from dodecyl alcohol.

9. Trialkyldodecylortho-silicates.

10. Tetradodecylortho-silicate.

11. Esters having the following general formula:

$$(RO)_3—B$$

wherein R represents the residue of the compound consisting of a plurality of hydrocarbon radicals at least one of which radicals is aliphatic and contains from 8 to 14 carbon atoms.

12. Esters having the following general formula:

$$(RO)_3—B$$

wherein R represents the residue of the compound consisting of a plurality of aliphatic radicals substantially all of which radicals contain from 8 to 14 carbon atoms.

13. Esters having the following general formula:

$$(RO)_3-B$$

wherein R represents the residue of the compound consisting of a plurality of aliphatic radicals one of which radicals is derived from dodecyl alcohol.

14. Dialkyl dodecyl borates.

15. Tridodecyl borate.

16. A process for the manufacture of neutral long chain silicates and borates which comprises reacting silicic and boric acid esters of alcohols boiling below 200° C. with an alcohol which contains from 8 to 14 carbon atoms.

17. A process for the manufacture of neutral long chain silicates and borates which comprises reacting silicic and boric acid esters of alcohols boiling below 200° C. with a mixture of higher fatty alcohols said mixture predominating in dodecyl alcohol.

18. A process for the manufacture of borates and silicates which comprises reacting a plurality of alcohols, at least one of which contains from 8 to 14 carbon atoms, with a compound having the following general formula:

$$(RO)_a-X$$

wherein X represents boron or silicon, R represents the radical of a volatile alcohol boiling below 200° C., and $a$ represents the valence of X.

19. A process for the manufacture of borates and silicates which comprises reacting a plurality of alcohols, at least one of which is aliphatic and contains from 8 to 14 carbon atoms, with a compound having the following general formula:

$$(RO)_a-X$$

wherein X represents boron or silicon, R represents the radical of a volatile alcohol boiling below 200° C., and $a$ represents the valence of X.

20. A process for the manufacture of borates and silicates which comprises reacting a plurality of aliphatic alcohols, at least one of which contains from 8 to 14 carbon atoms, with a compound having the following general formula:

$$(RO)_a-X$$

wherein X represents boron or silicon, R represents the radical of a volatile alcohol boiling below 200° C., and $a$ represents the valence of X.

21. A process for the manufacture of borates and silicates which comprises reacting a plurality of aliphatic alcohols, at least one of which contains from 8 to 14 carbon atoms, with a compound having the following general formula:

$$(C_2H_5O)_a-X$$

wherein X represents boron or silicon and $a$ represents the valence of X.

22. A process for the manufacture of borates and silicates which comprises reacting a mixture of cocoanut oil alcohols, substantially all of which contain from 8 to 14 carbon atoms, with a compound having the following general formula:

$$(C_2H_5O)_a-X$$

wherein X represents boron or silicon and $a$ represents the valence of X.

23. A process for the manufacture of borates and silicates which comprises esterifying by heating under substantially anhydrous conditions a mixture of cocoanut oil alcohols, substantially all of which contain from 8 to 14 carbon atoms, with a compound having the following general formula:

$$(C_2H_5O)_a-X$$

wherein X represents boron or silicon and $a$ represents the valence of X.

24. A process for the manufacture of silicates which comprises esterifying by heating under substantially anhydrous conditions a mixture of cocoanut oil alcohols, substantially all of which contain from 8 to 14 carbon atoms, with tetraethyl silicate.

25. The process of claim 24 wherein the mixture of alcohols predominates in dodecyl alcohol.

26. A process for the manufacture of borates which comprises esterifying by heating under substantially anhydrous conditions a mixture of cocoanut oil alcohols, substantially all of which contain from 8 to 14 carbon atoms, with triethyl borate.

27. The process of claim 26 wherein the mixture of alcohols predominates in dodecyl alcohol.

GEORGE DEWITT GRAVES.
JAMES HERBERT WERNTZ.